(12) United States Patent
Luckett, Jr. et al.

(10) Patent No.: US 9,529,512 B2
(45) Date of Patent: *Dec. 27, 2016

(54) WIRELESS SERVER ACCESS CONTROL SYSTEM AND METHOD

(71) Applicant: MYTH INNOVATIONS, INC., Dallas, TX (US)

(72) Inventors: James Albert Luckett, Jr., Dallas, TX (US); Chad Michael Rowlee, Hixson, TN (US); Shengli Fu, Denton, TX (US)

(73) Assignee: MYTH INNOVATIONS, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,963

(22) Filed: Jan. 27, 2015

(65) Prior Publication Data

US 2015/0143478 A1  May 21, 2015

Related U.S. Application Data

(63) Continuation of application No. 14/286,973, filed on May 23, 2014, now Pat. No. 8,943,569.

(Continued)

(51) Int. Cl.
*G06F 9/00* (2006.01)
*G06F 3/0484* (2013.01)
(Continued)

(52) U.S. Cl.
CPC ......... *G06F 3/04842* (2013.01); *G02B 27/017* (2013.01); *G06F 3/038* (2013.01);
(Continued)

(58) Field of Classification Search
USPC .............. 726/1, 4, 7, 11; 709/204; 715/736
See application file for complete search history.

(56) References Cited

U.S. PATENT DOCUMENTS

| 6,874,088 B1 * | 3/2005 | Stevens | H04L 63/0281 380/229 |
| 7,343,180 B2 * | 3/2008 | Kazakevich | H04B 7/0837 455/132 |

(Continued)

OTHER PUBLICATIONS

United States Patent and Trademark Office; International Preliminary Report on Patentability; PCT Application No. PCT/US2014/058543; Aug. 27, 2015.

(Continued)

*Primary Examiner* — Sayed Beheshti Shirazi
(74) *Attorney, Agent, or Firm* — Jackson Walker LLP; Christopher J. Rourk

(57) ABSTRACT

A wireless server access control system comprising a wireless server generating a local wireless communications network, the wireless server having a processor and a plurality of redundant data memory devices. A first wireless device coupled to the wireless server through the local wireless communications network. An access control system operating on the wireless server, the access control system configured to generate a user control on a user interface of the first wireless device to allow a user to permit or deny access to the processor and the data memory devices of the wireless server by a second wireless device through the local wireless communications network.

20 Claims, 11 Drawing Sheets

Related U.S. Application Data

(60) Provisional application No. 61/941,962, filed on Feb. 19, 2014, provisional application No. 61/938,049, filed on Feb. 10, 2014, provisional application No. 61/933,805, filed on Jan. 30, 2014, provisional application No. 61/885,369, filed on Oct. 1, 2013.

(51) Int. Cl.

| | | |
|---|---|---|
| G09G 5/377 | (2006.01) | |
| G02B 27/01 | (2006.01) | |
| H04W 12/04 | (2009.01) | |
| G06F 15/82 | (2006.01) | |
| G06T 1/20 | (2006.01) | |
| H04L 29/08 | (2006.01) | |
| H04W 12/08 | (2009.01) | |
| G06F 3/038 | (2013.01) | |
| G06T 19/00 | (2011.01) | |
| H04W 12/06 | (2009.01) | |
| H04L 29/06 | (2006.01) | |
| H04W 4/02 | (2009.01) | |
| G06F 3/147 | (2006.01) | |

(52) U.S. Cl.
CPC ............... *G06F 15/82* (2013.01); *G06T 1/20* (2013.01); *G06T 19/006* (2013.01); *G09G 5/377* (2013.01); *H04L 67/10* (2013.01); *H04W 12/04* (2013.01); *H04W 12/08* (2013.01); *G02B 2027/014* (2013.01); *G02B 2027/0138* (2013.01); *G02B 2027/0187* (2013.01); *G06F 3/147* (2013.01); *G06F 2203/0384* (2013.01); *H04L 63/0227* (2013.01); *H04W 4/02* (2013.01); *H04W 12/06* (2013.01)

(56) References Cited

U.S. PATENT DOCUMENTS

| | | | |
|---|---|---|---|
| 9,052,990 B2* | 6/2015 | Maria Joseph | G06F 12/1491 |
| 2002/0147004 A1* | 10/2002 | Ashmore | H04M 3/4938 |
| | | | 455/414.2 |
| 2003/0225675 A1* | 12/2003 | Failla | G06Q 40/06 |
| | | | 705/37 |
| 2006/0075478 A1* | 4/2006 | Hyndman | H04L 63/0218 |
| | | | 726/11 |
| 2007/0088822 A1 | 4/2007 | Coile et al. | |
| 2008/0166973 A1* | 7/2008 | Hart | H04W 16/18 |
| | | | 455/67.11 |
| 2009/0124350 A1* | 5/2009 | Iddings | G07F 17/32 |
| | | | 463/25 |
| 2009/0207076 A1* | 8/2009 | Schipper | G01S 19/24 |
| | | | 342/357.31 |
| 2009/0289956 A1 | 11/2009 | Douris et al. | |
| 2010/0158018 A1* | 6/2010 | Lee | H04L 45/00 |
| | | | 370/395.53 |
| 2010/0267375 A1* | 10/2010 | Lemmon | G06F 21/74 |
| | | | 455/418 |
| 2011/0249122 A1 | 10/2011 | Tricoukes et al. | |
| 2011/0271334 A1 | 11/2011 | Yang et al. | |
| 2012/0240182 A1* | 9/2012 | Narayanaswamy | G06F 9/5077 |
| | | | 726/1 |
| 2012/0249741 A1 | 10/2012 | Maciocci et al. | |
| 2012/0328101 A1* | 12/2012 | Lakshminarayanan | H04L 63/0823 |
| | | | 380/258 |
| 2013/0097657 A1* | 4/2013 | Cardamore | H04L 63/20 |
| | | | 726/1 |
| 2013/0203376 A1* | 8/2013 | Maier | H04W 4/005 |
| | | | 455/404.2 |
| 2013/0324230 A1* | 12/2013 | Iddings | G07F 17/32 |
| | | | 463/25 |
| 2013/0339865 A1* | 12/2013 | Oslund | H04W 12/08 |
| | | | 715/736 |
| 2014/0026192 A1* | 1/2014 | Gatewood | H04L 63/20 |
| | | | 726/4 |
| 2014/0143445 A1* | 5/2014 | Tuli | G06F 15/17325 |
| | | | 709/248 |
| 2014/0143507 A1* | 5/2014 | Maria Joseph | G06F 12/1491 |
| | | | 711/147 |
| 2014/0162693 A1* | 6/2014 | Wachter | H04W 4/021 |
| | | | 455/456.3 |
| 2014/0188990 A1* | 7/2014 | Fulks | H04L 65/403 |
| | | | 709/204 |
| 2014/0351315 A1* | 11/2014 | Panvelwala | G06F 9/5072 |
| | | | 709/203 |
| 2015/0026665 A1* | 1/2015 | Chen | G06F 11/3696 |
| | | | 717/124 |
| 2015/0088974 A1* | 3/2015 | Anderson | G06F 17/3089 |
| | | | 709/203 |

OTHER PUBLICATIONS

Russian Patent Office; International Search Report and Written Opinion; PCT Application No. PCT/US2014/058543; Apr. 2, 2015.

\* cited by examiner

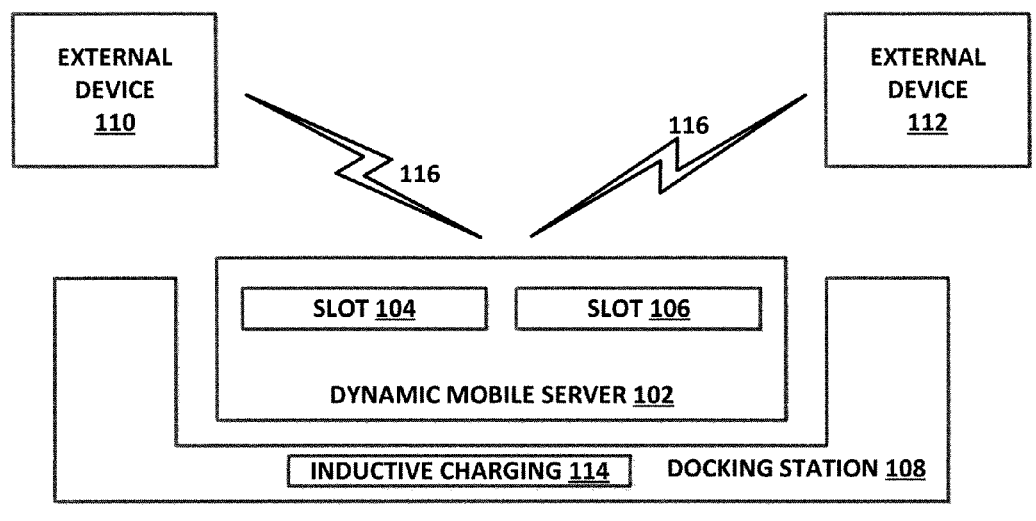
FIGURE 1    100
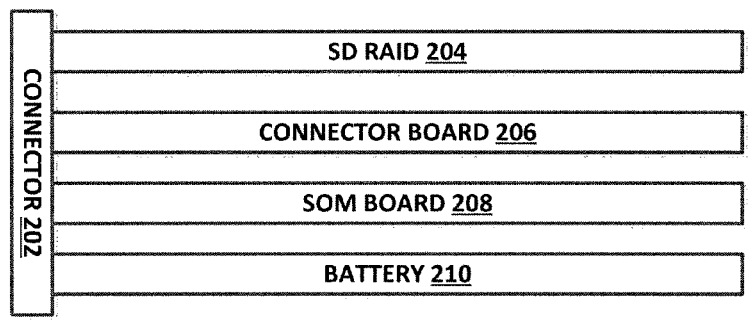
FIGURE 2    200

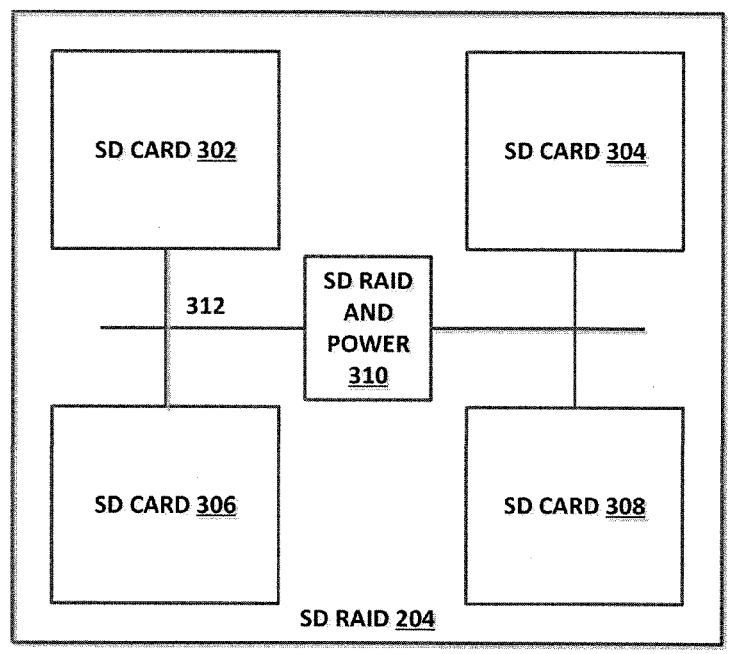
FIGURE 3    300
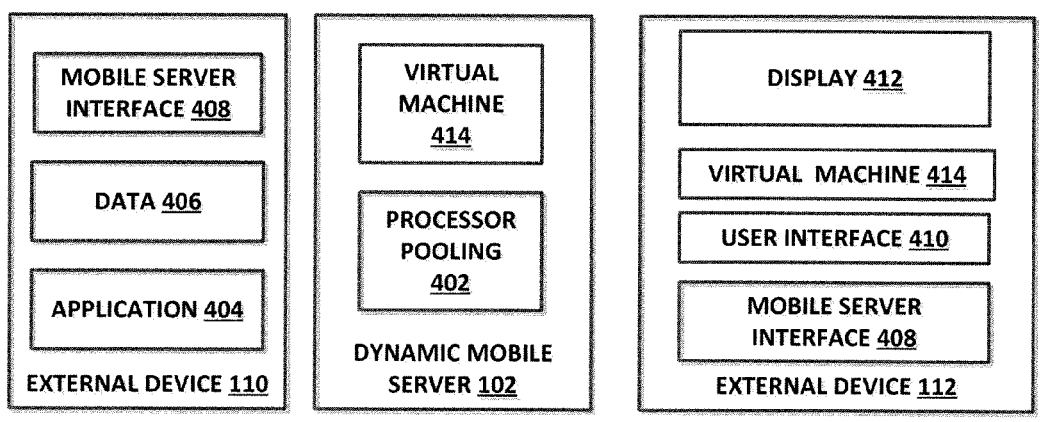
FIGURE 4    400

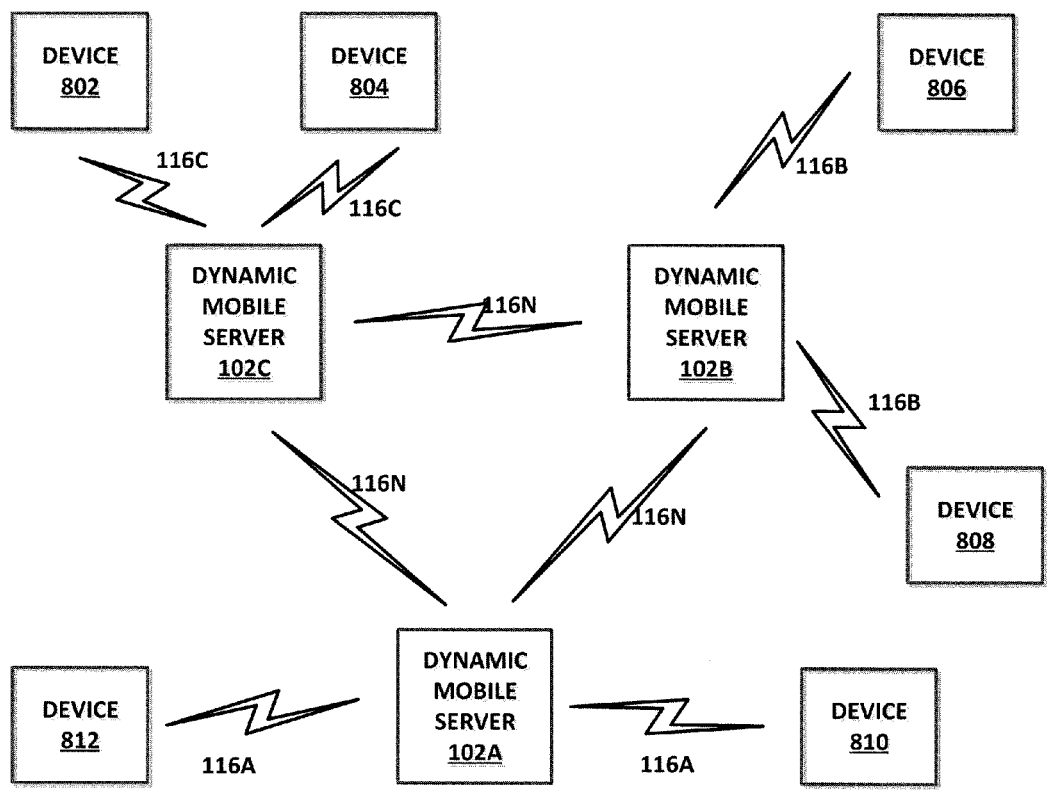

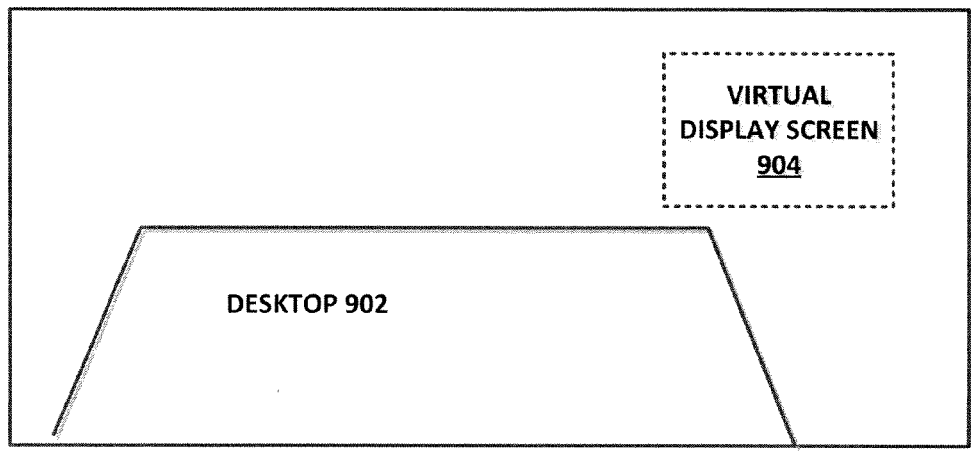
FIGURE 9     900 ⇧
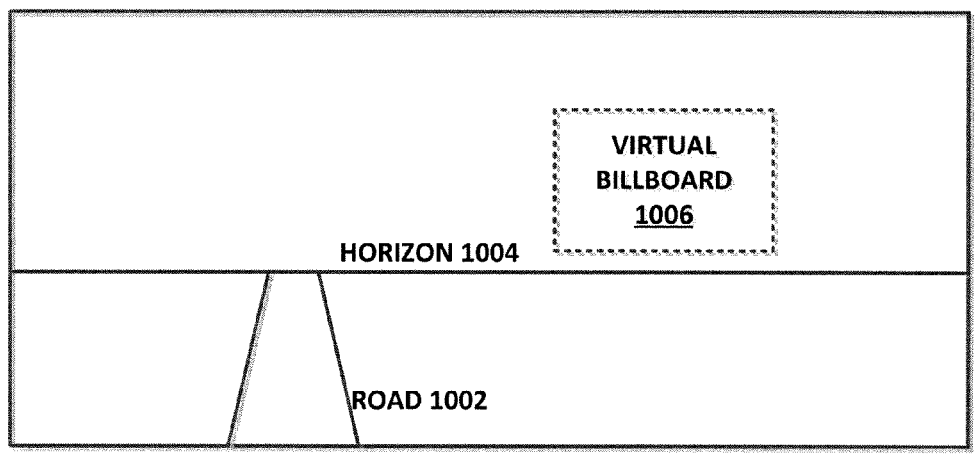
FIGURE 10     1000 ⇧

WIRELESS SERVER ACCESS CONTROL SYSTEM AND METHOD

RELATED APPLICATIONS

The present application is a continuation of U.S. patent application Ser. No. 14/286,973, filed May 23, 2014, now U.S. Pat. No. 8,943,569, which claims priority to U.S. Provisional Patent Application No. 61/941,962, filed Feb. 19, 2014; U.S. Provisional Patent Application No. 61/938,049, filed Feb. 10, 2014; U.S. Provisional Patent Application No. 61/933,805, filed Jan. 30, 2014; and U.S. Provisional Patent Application No. 61/885,369, filed Oct. 1, 2013, each of which are hereby incorporated by reference for all purposes as if set forth herein in their entirety.

TECHNICAL FIELD

The present disclosure relates generally to wireless servers, and more specifically to a wireless server access control system and method that allows mobile wireless devices to access a local wireless network of a wireless server.

BACKGROUND OF THE INVENTION

Servers are typically stationary and connected to a wireline network. While wireless connections to devices are provided, the location of the wireless devices is generally not capable of being readily determined, and the functionality of the server does not depend on the location of the wireless devices.

SUMMARY OF THE INVENTION

A wireless server access control system is provided that includes a wireless server generating a local wireless communications network, the wireless server having a processor and a plurality of redundant data memory devices. A first wireless device, such as a cell phone, is connected to the wireless server through the local wireless communications network. An access control system operating on the wireless server is configured to generate a user control on a user interface of the first wireless device to allow a user to permit or deny access to the processor and the data memory devices of the wireless server by a second wireless device through the local wireless communications network, such as an optical head mounted display.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a system for providing an environment for a dynamic mobile server, in accordance with an exemplary embodiment of the present disclosure;

FIG. 2 is a diagram of a system for providing a dynamic mobile server, in accordance with an exemplary embodiment of the present disclosure;

FIG. 3 is a diagram of a system for providing a redundant array of SD storage devices in accordance with an exemplary embodiment of the present disclosure;

FIG. 4 is a diagram of a system for providing a dynamic wireless server environment, in accordance with an exemplary embodiment of the present disclosure;

FIG. 9 is a diagram of a user interface screen in accordance with an exemplary embodiment of the present disclosure;

FIG. 10 is a diagram of a user interface screen in accordance with an exemplary embodiment of the present disclosure;

DETAILED DESCRIPTION OF THE INVENTION

Figure 5:
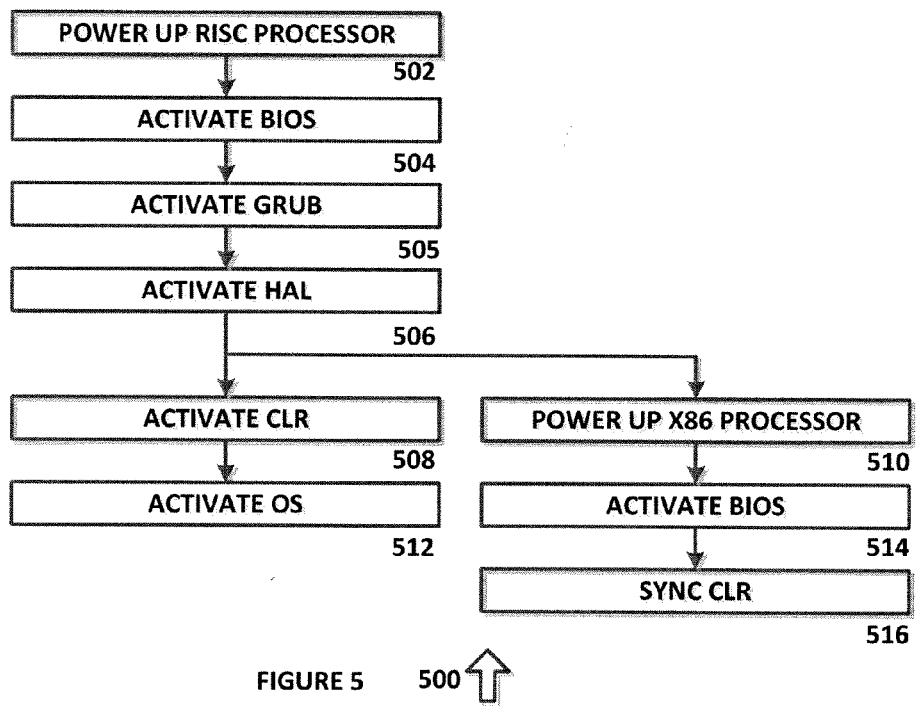
FIG. 5 is a diagram of an algorithm for a boot sequence for multiple processors in a dynamic mobile server environment, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for providing an environment for a dynamic mobile server 102, in accordance with an exemplary embodiment of the present disclosure. System 100 allows a dynamic mobile server 102 to interface with a plurality of different devices.

System 100 can be implemented in hardware or a suitable combination of hardware and software, and can be one or more software systems operating on one or more processors. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor can include a microcomputer or other suitable controller, memory devices, input-output devices, displays, data input devices such as keyboards or mice, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

System 100 includes dynamic mobile server 102, which includes hardware slots 104 and 106, and which is disposed within docking station 108. Docking station 108 includes inductive charging unit 114, which inductively couples to dynamic mobile server 102 to charge internal batteries of dynamic mobile sever 102. Messaging layer 116 is provided by a wireless data medium such as an 802.11x network and couples dynamic mobile server 102 to external device 110 and external device 112. Although two external devices are shown, dynamic mobile server 102 can operate without any additional external devices or with a suitable number of additional external devices, such as ten or more.

Dynamic mobile server 102 is dynamic in that the number of external devices can be increased or decreased during operation of dynamic mobile server 102, and is mobile in that dynamic mobile server 102 can be removed from docking station 108 and carried by the user to different locations. As dynamic mobile server 102 is moved, or as different devices are moved within the range of the wireless network providing the wireless media over which messaging layer 116 operates, the number of devices such as external device 110 and external device 112 that form part of the network created by dynamic mobile server 102 can increase or decrease, and thus can change dynamically. Dynamic mobile server 102 is configured to be self-contained and small enough to be readily carried by a user, such as in a pocket, a backpack, a brief case, a purse or in other suitable manners, so as to provide a dynamic mobile wireless server that creates a mobile mesh network environment.

FIG. 2 is a diagram of a system 200 for providing a dynamic mobile server, in accordance with an exemplary embodiment of the present disclosure. System 200 includes connector 202, which connects SD RAID board 204, connector board 206, SOM board 208 and battery 210. Connector 202 is configured to allow a user to add or remove components from system 200, such as after removing an outer housing. SD RAID board 204 is a redundant array of SD data storage devices, which reduce the power requirements for system 200 because SD data storage devices are not required to be continuously powered. Connector board 206 allows one or more additional components to be added to system 200 by a user. SOM board 208 is a system on module (SOM) board that provides a processor that lacks standard input/output connections, which are provided through connector 202 and connector board 206. Battery 210 is configured to allow system 200 to operate independent of an external power source, and can include inductive charging systems, power connectors and other suitable components.

In operation, system 200 provides a portable server system with a user-interchangeable hardware configuration, and with a low-power redundant array of storage devices that allows system 200 to be used as a dynamic mobile server.

FIG. 3 is a diagram of a system 300 for providing a redundant array of SD storage devices in accordance with an exemplary embodiment of the present disclosure. System 300 includes SD cards 302, 304, 306 and 308, which can be hot swappable and user-interchangeable. In one exemplary embodiment, each SD card 302 through 308 can be connected to a slot on an external housing, such as to allow a user to add or remove SD cards during operation. The SD cards can also or alternatively include one or more processors, RF communication systems or other suitable components.

System 300 includes SD RAID and power controller 310 and SD bus 312, which is coupled to SD cards 302 through 308. SD RAID and power controller 310 allocates data storage to SD cards 302 through 308, such as to provide redundant storage based on the number of available SD cards, to create redundant storage when a card is replaced, or for other suitable purposes. In addition, because SD cards do not require continuous power when they are not in use, system 300 provides significant power savings over servers that use disk-based memory.

FIG. 4 is a diagram of a system 400 for providing a dynamic wireless server environment, in accordance with an exemplary embodiment of the present disclosure. System 400 can be implemented in hardware or a suitable combination of hardware and software, and can be one or more software systems operating on one or more processors.

System 400 includes dynamic mobile server 102, which includes processor pooling system 402 and virtual machine 414, and is coupled to external device 110 over messaging layer 116 (not shown). External device 110 includes mobile server interface 408, which can be a dedicated application, an application that operates in conjunction with a web browser, or other suitable applications. In one exemplary embodiment, a user activates mobile server interface 408 by first activating a wireless connection with dynamic mobile server 102, such as by selecting a service set identifier (SSID) from a list of available wireless networks, by entering a network password for the wireless network, and then by activating a web browser and by entering a user identifier and password for access to dynamic mobile server 102. In another exemplary embodiment, a user can install an application and then configure the application to access dynamic mobile server 102, such as by entering a userid and password, and dynamic mobile server 102 can authenticate the device for subsequent access based on the device's media access controller identifier, the processor identifier or other suitable data. The application can also or alternatively allow dynamic mobile server 102 to wake the device if it is not powered up, such as by utilizing a wake on LAN protocol or other suitable systems or devices.

Dynamic mobile server 102 can also interface with external device 112 over messaging layer 116 in a similar manner. External device 112 can include mobile server interface 408, user interface 410, virtual machine 414 and display 412. Dynamic mobile server 102 can allow a user of external device 112 to access application 404 and data 406 of external device 110 in the following exemplary embodiments. In one exemplary embodiment, a user of external device 112 accesses dynamic mobile server 102 through mobile server interface 408, and obtains a list of available applications and data on dynamic mobile server 102 and other external devices that are connected to dynamic mobile server 102 through messaging layer 116, such as application 404 and data 406 of external device 110. If the user selects data 406, then dynamic mobile server 102 provides access to data 406, regardless of whether external device 110 is powered on or off. If the user selects application 404, then dynamic mobile server 102 activates application 404 if external device 110 is powered on, or activates external device 110 if it is powered off and has wake on LAN functionality or other suitable systems or protocols. Processor pooling 402 of dynamic mobile server 102 allocates processor resources to allow application 404 to operate transparently to the user of external device 112, such as by instantiating virtual machine 414 on dynamic mobile server 102, by instantiating virtual machine 414 on external device 112 or in other suitable manners. The user then interfaces with application 404 using user interface 410 and display 412.

Mobile server interface 408 can be configured to synchronize data 406 from device 110 to dynamic mobile server 102 whenever device 110 enters within range of dynamic mobile server 102. Alternatively, data 406 can be allocated between synchronizable data and non-synchronizable data, such as to protect the privacy of certain types of data on device 110. SD cards 302 through 308 of dynamic mobile server 102 can likewise be partitioned to store data for predetermined external devices (e.g. cellular telephones of predetermined users), for predetermined applications (e.g. text messaging applications and email applications), for predetermined types of data (image files, audiovisual data files, contact lists), or in other suitable manners.

In operation, system 400 allows a user of one external device to access data, applications and processor resources of dynamic mobile server 102 or of another external device, such as by activating the other external device using dynamic mobile server 102, by using pooled data or processor resources of system 400 or in other suitable manners.

FIG. 5 is a diagram of an algorithm 500 for a boot sequence for multiple processors in a dynamic mobile server environment, in accordance with an exemplary embodiment of the present disclosure. Algorithm 500 can be implemented in hardware or a suitable combination of hardware and software, and can be one or more software systems operating on one or more processors.

Algorithm 500 begins at 502, where power is applied to a reduced instruction set computing (RISC) processor, after which the algorithm proceeds to 504, where a basic input/output system (BIOS) of the RISC processor is activated. In one exemplary embodiment, the BIOS code can be stored in a predetermined memory location, and can be automatically loaded into the RISC processor upon activation. The algorithm then proceeds to 505.

At 505, a multiple boot loader such as the GNU GRUB or other suitable systems is activated. In one exemplary embodiment, one or more of a plurality of operating systems can be selected for multiple boot loading, chain loading, or other suitable processes can also or alternatively be used. The algorithm then proceeds to 506.

At 506, the hardware abstraction layer (HAL) is activated, such as by loading one or more algorithms that control the operation of a SON or other suitable processors. The algorithm then proceeds in parallel to 508, where a common language runtime (CLR) library or other suitable common language infrastructure is activated on the RISC processor, and to 510, where an X86 processor is powered on. In one exemplary embodiment, the X86 processor can be part of an SD RAID board, such as by using an Intel Edison SD card or other suitable devices. In another exemplary embodiment, the X86 processor can be located in an external device that is powered on using a wake on LAN protocol or other suitable systems or devices.

As the algorithm proceeds from 508 to 512, where the operating system is loaded into the RISC processor and is activated, the algorithm also proceeds from 510 to 514, where the BIOS of the X86 processor is activated, and then to 516, where the DLL of the X86 processor is synchronized with the CLR of the RISC processor.

Figure 6:
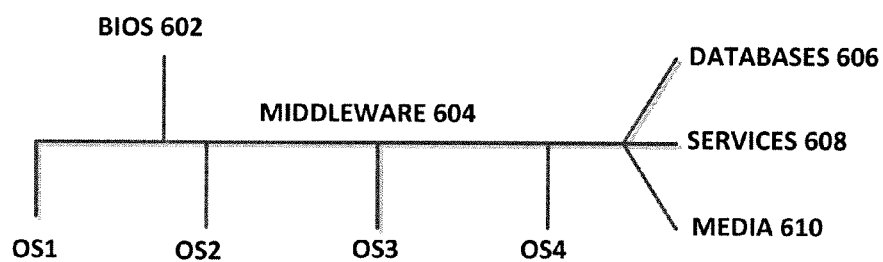
FIG. 6 is a diagram of a software architecture in accordance with an exemplary embodiment of the present disclosure.

FIG. 6 is a diagram of a software architecture 600 in accordance with an exemplary embodiment of the present disclosure. Software architecture 600 includes BIOS 602, middleware 604, databases 606, services 608, media 610, and operating systems OS1, OS2, OS3 and OS4, and can be implemented on dynamic mobile server 102 or other suitable processors. Software architecture 600 allows dynamic mobile server 102 to operate a number of different operating systems that can communicate with each other through middleware 604, as well as with databases 606, services 608, media 610 and external devices that are connected to dynamic mobile server 102 through messaging layer 116.

Figure 7:
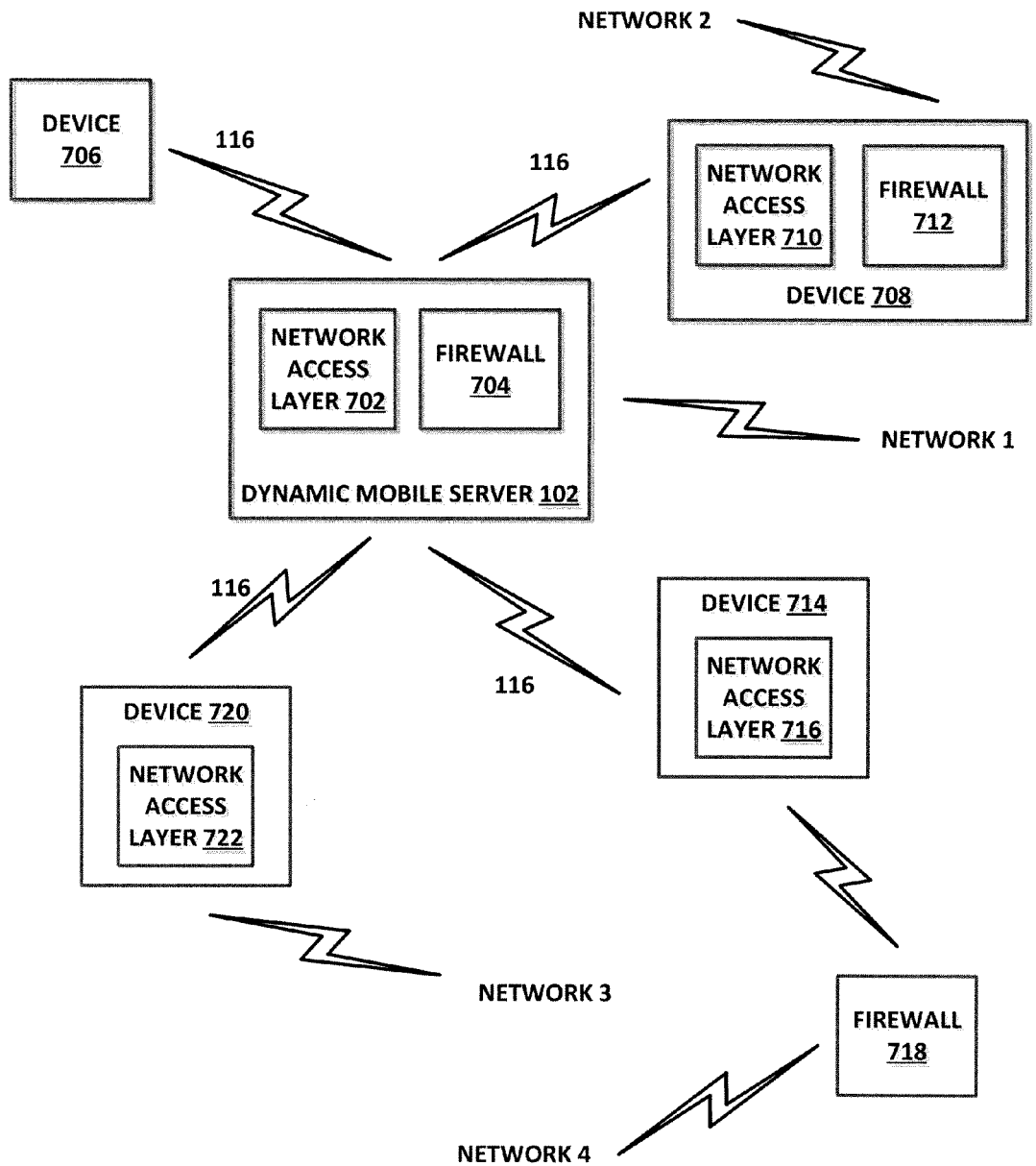
FIG. 7 is a diagram of a mobile computing cluster with multiple network connections, in accordance with an exemplary embodiment of the present disclosure.

FIG. 7 is a diagram of a mobile computing cluster 700 with multiple network connections, in accordance with an exemplary embodiment of the present disclosure. Mobile computing cluster 700 includes dynamic mobile server 102, which includes network access layer 702 and firewall 704, which provides access to network 1. In one exemplary embodiment, network 1 can be the Internet or other public networks, and dynamic mobile server 102 can access data over the network on behalf of itself or other devices that are connected to dynamic mobile server 102, with the benefit of firewall 704.

Dynamic mobile server 102 is also coupled to device 706 over messaging layer 116, and can provide network 1 access to device 706, as well as firewall protection to prevent unauthorized external devices on network 1 from accessing device 706. Dynamic mobile server 102 is further coupled to device 708, which includes network access layer 710 and firewall 712, and can provide network 1 access to device 708, as well as firewall protection to prevent unauthorized external devices on network 1 from accessing device 708. Because device 708 also has network access layer 710 and firewall 712, it can also access network 2 independent of the access to network 1 through dynamic mobile server 102, but firewall 704 of dynamic mobile server 102 can be configured to prevent unauthorized external devices on network 2 from accessing device 706 or dynamic mobile server 102. Firewall 704 can also or alternatively be configured to prevent unauthorized external devices on network 2 from accessing device 708, but must be coordinated with network access layer 710 and firewall 712 in order to provide that additional protection. In one exemplary embodiment, when network 1 and network 2 are the same network, dynamic mobile server 102 and device 708 can be configured to allow one of dynamic mobile server 102 and device 708 to control all network access.

Dynamic mobile server 102 is further coupled to device 714, which includes network access layer 716, and which is connected to network 4 through an external firewall 718, and can provide network 1 access to device 714, as well as firewall protection to prevent unauthorized external devices on network 1 from accessing device 714. Because device 714 also has network access layer 716 and can access network 4 through firewall 718, it can also access network 4 independent of the access to network 1 through dynamic mobile server 102, but firewall 704 of dynamic mobile server 102 can be configured to prevent unauthorized external devices on network 4 from accessing device 706, device 708 or dynamic mobile server 102. Firewall 704 can also or alternatively be configured to prevent unauthorized external devices on network 4 from accessing device 714, but must be coordinated with network access layer 716 and firewall 718 in order to provide that additional protection. In one exemplary embodiment, when network 1, network 2 and network 4 are the same network, dynamic mobile server 102, device 708 and device 714 can be configured to allow one of dynamic mobile server 102, device 708 and device 714 to control all network access. Likewise, when network 1 and network 4 are the same network, dynamic mobile server 102 and device 714 can be configured to allow one of dynamic mobile server 102 and device 714 to control all network access to those networks.

Dynamic mobile server 102 is further coupled to device 720, which includes network access layer 722, and which is connected to network 3 without an external firewall, and can provide network 1 access to device 720, as well as firewall protection to prevent unauthorized external devices on network 1 from accessing device 720. Because device 720 also has network access layer 722 and can access network 3 without any firewall protection, it can also access network 3 independent of the access to network 1 through dynamic mobile server 102, but firewall 704 of dynamic mobile server 102 can be configured to prevent unauthorized external devices on network 3 from accessing device 706, device 708, device 720 or dynamic mobile server 102. In one exemplary embodiment, when network 1, network 2, network 3 and network 4 are the same network, dynamic mobile server 102, device 708, device 714 and device 720 can be configured to allow one of dynamic mobile server 102, device 708, device 714 and device 720 to control all network access. Likewise, when network 1 and network 3 are the same network, dynamic mobile server 102 and device 720 can be configured to allow one of dynamic mobile server 102 and device 720 to control all network access to those networks.

In addition, firewall 704 protects dynamic mobile server 102, device 706, device 708, device 714 and device 720 from unauthorized access to each other. In one exemplary embodiment, data and applications on devices in mobile computing cluster 700 can be configured to allow access by other some, all or no other predetermined devices in mobile computing cluster 700, so as to provide additional protection from unauthorized access.

In operation, mobile computing cluster 700 allows multiple devices with network access and firewall protection to be coordinated, so as to protect devices that are connected to mobile computing cluster 700 from unauthorized external devices on networks that those devices might be connected to, as well as unauthorized access between the devices that form mobile computing cluster 700. Because access to dynamic mobile server 102 is dynamic, firewall 704 is configured to evaluate the network connections of each new device as it is added to mobile computing cluster 700 and to set suitable access controls and firewall protection.

Figure 8:
FIG. 8 is a diagram of dynamic MESH network in accordance with an exemplary embodiment of the present disclosure.

FIG. 8 is a diagram of dynamic MESH network 800 in accordance with an exemplary embodiment of the present disclosure. Dynamic MESH network 800 includes dynamic mobile servers 102A, 102B and 102C, where dynamic mobile server 102A is coupled to device 810 and 812 over messaging layer 116A, dynamic mobile server 102A is coupled to device 806 and 808 over messaging layer 116B, and dynamic mobile server 102C is coupled to device 802 and 804 over messaging layer 116C. In addition, dynamic mobile servers 102A, 102B and 102C are coupled to each other over messaging layer 116N, which can be one or more of messaging layers 116A, 116B and 116C, or a different messaging layer that uses a different timing, frequency spectrum/allocation, different messaging protocol or other suitable messaging layers from each of messaging layers 116A, 116B and 116C. Likewise, each of messaging layers 116A, 116B and 116C can use a different timing, frequency spectrum/allocation, different messaging protocol or other suitable messaging layers from each of the other messaging layers 116A, 116B and 116C, or the same messaging layer can be used for all communications.

In addition, dynamic mobile servers 102A, 102B and 102C can be configured to provide an ad hoc network, such as where one of dynamic mobile servers 102A, 102B and 102C is arbitrarily selected to be the controlling node, where node control is dynamically assigned based on communications or processing needs, or in other suitable manners. In one exemplary embodiment, dynamic mobile servers 102A, 102B and 102C can be used to allocate unused or idle processor capacity between each other, such as where device 802 is operating an application and requires additional processing power. In this exemplary embodiment, dynamic mobile servers 102A, 102B and 102C and a suitable number of additional dynamic mobile servers that are similarly coupled to one or more of dynamic mobile servers 102A, 102B and 102C can be used to provide additional processing capacity for one or more of devices 802 through 812. For example, if 100 dynamic mobile servers are connected in a dynamic MESH network, then processing capacity can be shared between each of the dynamic mobile servers so as to allow one device that is coupled to one of the dynamic mobile servers to potentially use some of the processing capacity of each of the 100 dynamic mobile servers. Because such allocation of processing capacity will be further affected by the communication speed and MESH network reliability within each of the dynamic mobile severs of the MESH network, the amount of processing capacity would typically be less than 100 times the amount of a single dynamic mobile server, but under certain conditions, substantial multiples of processing capacity could be realized.

In addition, dynamic MESH network 800 can provide an alternative communications network for devices 802 through 812. In this exemplary embodiment, devices 802 through 812 could be cellular telephones or other suitable communications devices, and in the event of a cellular communications network interruption, communications between devices 802 through 812 that would otherwise be routed through the cellular communications network could alternately be routed within dynamic MESH network 800. Dynamic MESH network 800 could also be used to provide improved security to such external network communications, such as to provide improved encryption or data security.

FIG. 9 is a diagram of a user interface screen 900 in accordance with an exemplary embodiment of the present disclosure. User interface screen 900 can be generated using an optical head mounted display (OHMD) that is driven by a dynamic mobile server 102 or in other suitable manners.

User interface screen 900 includes desktop 902 and virtual display screen 904. Desktop 902 is the image captured by a camera of the OHMD as well as the image that is seen by the user that is wearing the OHMD. The image data generated by the camera is analyzed to detect the outline, color, or other distinguishing physical characteristics of desktop 902, and desktop 902 can be confirmed based on location data associated with the OHMD, such as where the OHMD includes a GPS data system, where the OHMD receives positioning data from dynamic mobile server 102, or in other suitable manners. Virtual display screen 904 is generated on the display of the OHMD, and can be associated with a fixed position relative to desktop 902, such that the position of virtual display screen 904 remains fixed if the user of the OHMD moves around. In this exemplary embodiment, virtual display screen 904 can be configured to display predetermined data, such as audiovisual data, text data, graphic data, one or more user-selectable controls, one or more user input devices, or other suitable data.

In one exemplary embodiment, the location of virtual display 904 can be modified by the user, such as by raising one hand and placing it on virtual display 904, and then by executing a relocation control. The relocation control can be a verbal command that is recorded by a microphone of the OHMD and processed by a speech detection processor to detect a verbal command by the user, to distinguish the verbal command of others from a verbal command of the user, or by other suitable audio processing. Likewise, the relocation control can be a predetermined gesture, such as a grabbing gesture that is executed after the user places the user's hand on virtual display 904. Additional processing and user interface controls can also or alternatively be used, such as by generating a text prompt (MOVE DISPLAY?) that the user can confirm with a verbal command (such as a spoken word, a clicking sound or a whistle), by changing the appearance of virtual display (e.g. making it brighter, changing its color, encircling the virtual display with a predetermined colored outline), or in other suitable manners, and the user can confirm the selection by a predetermined motion with the same hand that the user has grabbed the display with (such as rotating the closed hand towards the OHMD), by a predetermined motion with the other hand, by a predetermined motion with the user's head (such as a nod), or in other suitable manners.

Once the user has confirmed that virtual display 904 is to be relocated, display 900 allows the user to move virtual display 904 to a new location, such as by associating virtual display 904 with the user's hand, with an object on the user's hand (such as a ring or watch) or in other suitable manners. When the user has placed virtual display 904 in a new location, the user can release virtual display 904 using a suitable command, such as a spoken command, a predetermined hand gesture, a predetermined head gesture or in other suitable manners. In this manner, the user can interact with virtual display 904.

Although interactions with virtual display 904 have been described, other suitable interactions can also or alternatively be provided, such as interactions with graphic images (such as weapons or sporting gear for computer games), interactions with user controls (such as knobs, buttons or sliders), interactions with user interface devices (such as a virtual keyboard) or other suitable interactions. Such graphic images, user controls, user interface devices or other suitable image data can be fixed to predetermined locations, such as by generating them relative to the location of dynamic mobile server 102, by generating them relative to location data generated by the OHMD, or in other suitable manners. In this manner, the user of the OHMD can move relative to virtual display 904 or other suitable image data, and the image data can remain in place as if it is anchored to an actual physical location.

FIG. 10 is a diagram of a user interface screen 1000 in accordance with an exemplary embodiment of the present disclosure. User interface screen 1000 can be generated using an optical head mounted display (OHMD) that is driven by a dynamic mobile server 102 or in other suitable manners.

User interface screen 1000 includes road 1002, horizon 1004 and virtual billboard 1006. As discussed above, road 1002 and horizon 1004 can be the image captured by a camera of the OHMD as well as the image that is seen by the user that is wearing the OHMD. The image data generated by the camera is analyzed to detect the outline, color, or other distinguishing physical characteristics of road 1002 and horizon 1004, and OHMD can also or alternatively receive location data, such as where the OHMD includes a GPS data system, where the OHMD receives positioning data from dynamic mobile server 102, or in other suitable manners. Virtual billboard 1006 is generated on the display of the OHMD, and can be associated with a fixed position relative to road 1002 and horizon 1004, such that the position of virtual billboard 1006 remains fixed as the user drives down road 1002. In this exemplary embodiment, virtual billboard 1006 can be configured to display predetermined data, such as audiovisual data, text data, graphic data, one or more user-selectable controls, one or more user input devices, or other suitable data.

Figure 11:
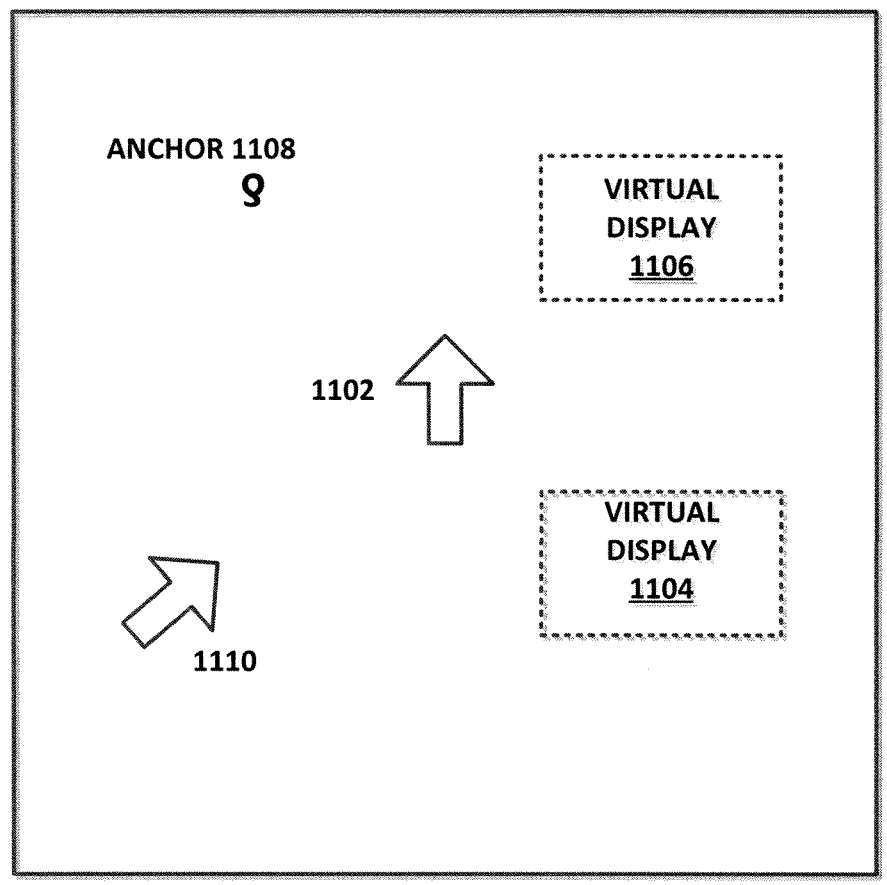
FIG. 11 is a diagram of a room layout in accordance with an exemplary embodiment of the present disclosure.

FIG. 11 is a diagram of a room layout 1100 in accordance with an exemplary embodiment of the present disclosure. Room layout 1100 includes the location of user 1102, which is shown as an arrow that is pointing in the direction that the user is facing, virtual display 1004, virtual display 1006, anchor 1008 and user 1110. The OHMD of users 1102 and 1110 can generate directional data (such as from a compass system or other suitable systems), location data (such as from a GPS system or other suitable systems), motion data (such as from accelerometers or other suitable systems) and other suitable data that allows the OHMD to determine the associated user's position. User 1102 will perceive (through user 1102's OHMD) virtual display 1106 in room layout 110 as being on user 1102's right hand side, will perceive image data associated with anchor 1108 as being located on user 1102's left hand side, and will not be able to see virtual display 1104, because virtual display 1104 is located behind user 1102. User 1110 will perceive (through user 1110's OHMD) virtual display 1106 in room layout 110 as being in front of user 1110, will perceive image data associated with anchor 1108 as being located on user 1110's left hand side, and will perceive virtual display 1104 as being on user 1110's right hand side. The locations of virtual display 1104, virtual display 1106 and the image associated with anchor 1108 can be fixed, and can be associated with a point in space, a physical object, or other suitable items.

Figure 12:
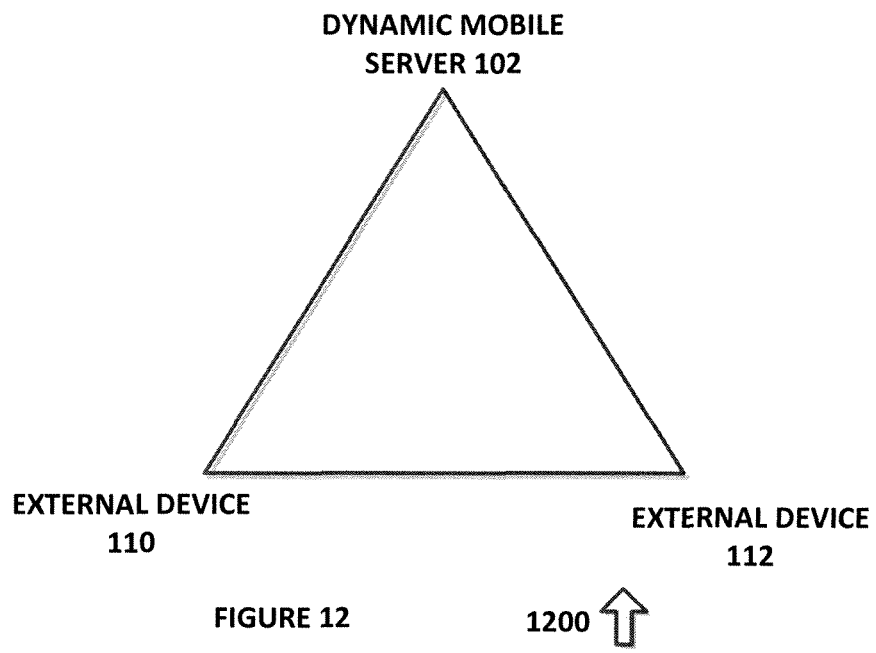
FIG. 12 is a diagram of a calibration layout in accordance with an exemplary embodiment of the present disclosure.

FIG. 12 is a diagram of a calibration layout 1200 in accordance with an exemplary embodiment of the present disclosure. Calibration layout 1200 can be used to calibrate the location of dynamic mobile server 102, external device 110 and external device 112, by providing a predetermined location and separation distance. In this exemplary embodiment, dynamic mobile server 102 can transmit and receive radio frequency electromagnetic waves, and can determine a time associated with a transmission to external device 110 and external device 112. Once external device 110 and external device 112 have been placed on calibration layout 1200, that transmission time can be calibrated to the associated distance of calibration layout 1200. Likewise, additional data can be used to further distinguish the location of external device 110 and external device 112 relative to dynamic mobile server 102, such as by utilizing timing measurement systems of external device 110 and external device 112. When dynamic mobile server 102, external device 110 and external device 112 are subsequently moved relative to each other, the change in location can be detected by the increase or decrease in the associated transmission times between these components.

Figure 13:
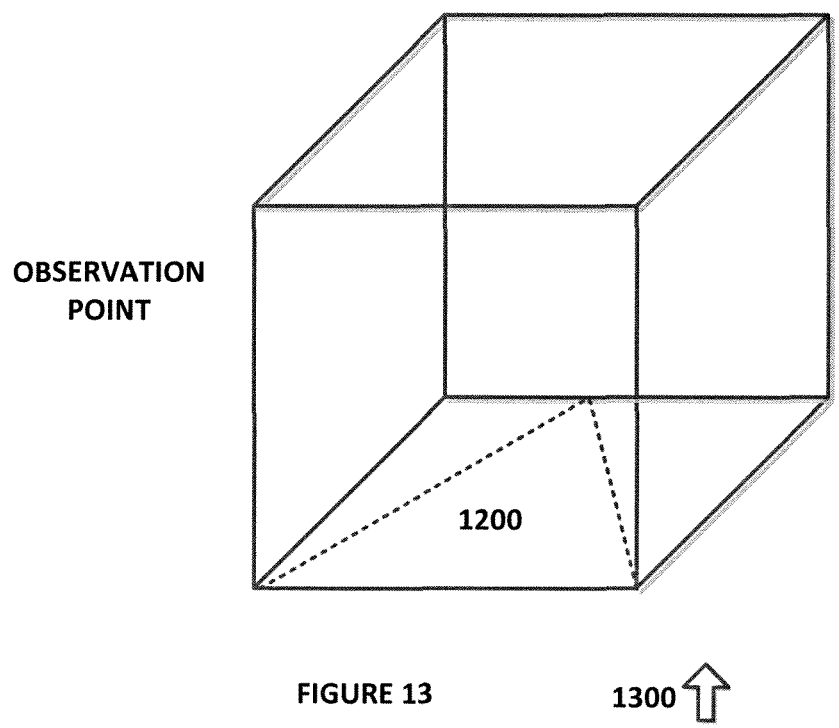
FIG. 13 is a diagram of a spatial grid in accordance with an exemplary embodiment of the present disclosure.

FIG. 13 is a diagram of a spatial grid 1300 in accordance with an exemplary embodiment of the present disclosure. Spatial grid 1300 includes calibration layout 1200, which is placed at the bottom of a cube that can be viewed from an external observation point, such as by an OHMD. The image data generated at the observation point can be analyzed to detect mobile server 102, external device 110 and external device 112 on calibration layout 1200, so as to add a third spatial location dimension to each of mobile server 102, external device 110 and external device 112. In this regard, each of mobile server 102, external device 110 and external device 112 can be assigned a spatial location (X, Y, Z) and device identifier D that are mapped to a network address, such as an Internet Protocol Version 4 (IPV4) or Internet Protocol Version 6 (IPV6) network address. As mobile server 102, external device 110 and external device 112 are moved within spatial grid 1300, the spatial location of each can be updated relative to the mapped address.

Figure 14:
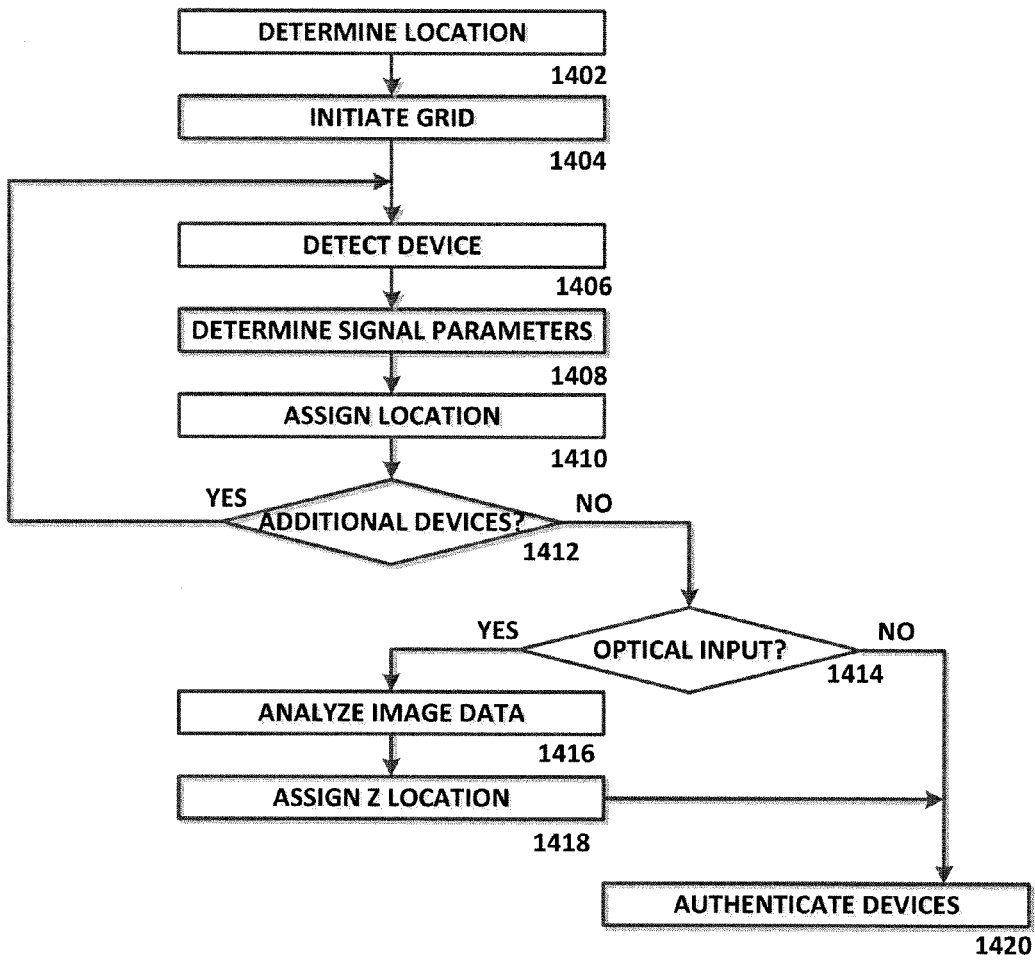
FIG. 14 is a diagram of an algorithm in accordance with an exemplary embodiment of the present disclosure.

FIG. 14 is a diagram of an algorithm 1400 in accordance with an exemplary embodiment of the present disclosure. Algorithm 1400 can be implemented in hardware or a suitable combination of hardware and software, and can be one or more software systems operating on one or more processors.

Algorithm 1400 begins at 1402, where a location is determined for dynamic mobile server 102 or other suitable systems. In one exemplary embodiment, the location can be determined by transmitting a query to a global positioning system (GPS) that receives data from two or more transmitters and that generates the location data based on timing data and other data received from the two or more transmitters. The algorithm then proceeds to 1404.

At 1404, a grid is initiated. In one exemplary embodiment, the grid can be derived from the location data and network address data, such as IPV4 or IPV6 address data. In this exemplary embodiment, dynamic mobile server 102 can access a network, such as a wireless network access over a 4G network, and can be assigned a network address, such as having the format a.b.c.d, where each letter denotes an 8 bit binary digit. The grid can be generated using the network address as a reference, such as by adding and subtracting values from the network address. In this exemplary embodiment, a network address of 128.101.31.12 could be assigned to dynamic mobile server 102 or other suitable devices, and the grid can be initiated to provide +/1 10 locations relative to the location of dynamic mobile server 102, such that the grid includes locations ranging from (118-138), (91-111), (21-42), which correspond to (X,Y,Z) coordinates relative to the location of dynamic mobile server 102. In this exemplary embodiment, range of the grid will be equal to the range of the local wireless network generated by dynamic mobile server 102, and compass data or other suitable data can be used to assign a coordinate to magnetic north or other suitable locations. In this manner, the location of other devices can be identified relative to dynamic mobile server 102. Likewise, device identifiers can be assigned the fourth address location relative to dynamic mobile server 102. The algorithm then proceeds to 1406.

At 1406, a device is detected. In one exemplary embodiment, the device can be detected during a calibration process, a device that has already been authenticated can be detected, or other suitable processes can also or alternatively be used. The algorithm then proceeds to 1408, where signal parameters are determined. In one exemplary embodiment, the signal parameters can be determined during a calibration process, the signal parameters can be applied to prior calibration data, or other suitable processes can also or alternatively be used. The algorithm then proceeds to 1410, where a location is assigned to the device relative to the grid. In one exemplary embodiment, dynamic mobile server 102 can generate the grid as described, and can determine a location of the device relative to dynamic mobile server 102. That relative location will be within the grid formed by dynamic mobile server 102 if the device is within the range of the wireless network generated by mobile device 102, such that coordinates (X,Y,Z) can be assigned to the device based on the grid generated at 1404. The algorithm then proceeds to 1412.

At 1412, it is determined whether there is another device within range of the wireless network generated dynamic mobile server 102, such as by detecting dynamic host configuration protocol (DHCP) messaging. If it is determined that there is another device, the algorithm returns to 1406, otherwise, the algorithm proceeds to 1414.

At 1414, it is determined whether there is an optical input, such as image data generated by an OHMD or other suitable image data. If it is determined that an optical input is not present, the algorithm proceeds to 1420. If it is determined that an optical input is present, the algorithm proceeds to 1416, where the image data is analyzed to detect the one or more devices that have been detected. In one exemplary embodiment, the detected device can have an associated physical profile, such as a laptop or desktop computer, a television set or other suitable devices, and the image data can be analyzed to detect these associated profiles. In another exemplary embodiment, a calibration layout 1200 or other suitable calibration layouts can be used to provide a guide for detection within the image data, or other suitable processes or configurations can also or alternatively be used. The algorithm then proceeds to 1418.

At 1418, a Z axis coordinate is assigned to the detected devices. In one exemplary embodiment, the Z axis coordinate can be based on the analyzed image data, radio frequency timing data received by the dynamic mobile server 102, radio frequency timing data received by the OHMD, radio frequency timing data received by other devices, or other suitable data. If no Z axis coordinate data can be detected, then a default Z axis coordinate value can be assigned. The algorithm then proceeds to 1420, where the one or more devices are authenticated. In one exemplary embodiment, the devices can be authenticated using a challenge procedure, where a first device is assigned to be a primary device associated with a dynamic mobile server 102. In this exemplary embodiment, the primary device can generate an authentication key, such as by randomly selecting a data field from each of a plurality of profile documents associated with the primary device and using that selection of random data fields to generate the authentication key. Likewise, other suitable authentication keys can be generated. The primary device can then select other devices and can transmit the authentication key to those other devices, to allow the other devices to be automatically authenticated to the network.

In operation, algorithm 1400 allows a spatial location grid to be generated to associate wireless devices within a local wireless network with a physical location relative to a wireless server, such as to allow image data to be generated on an OHMD or other suitable devices that represents the devices, to allow a user to locate and utilize the other devices, or for other suitable purposes. Although algorithm 1400 is shown as a flow chart, the functions of algorithm 1400 can also or alternatively be implemented as a state diagram, as one or more objects or in other suitable manners.

Figure 15:
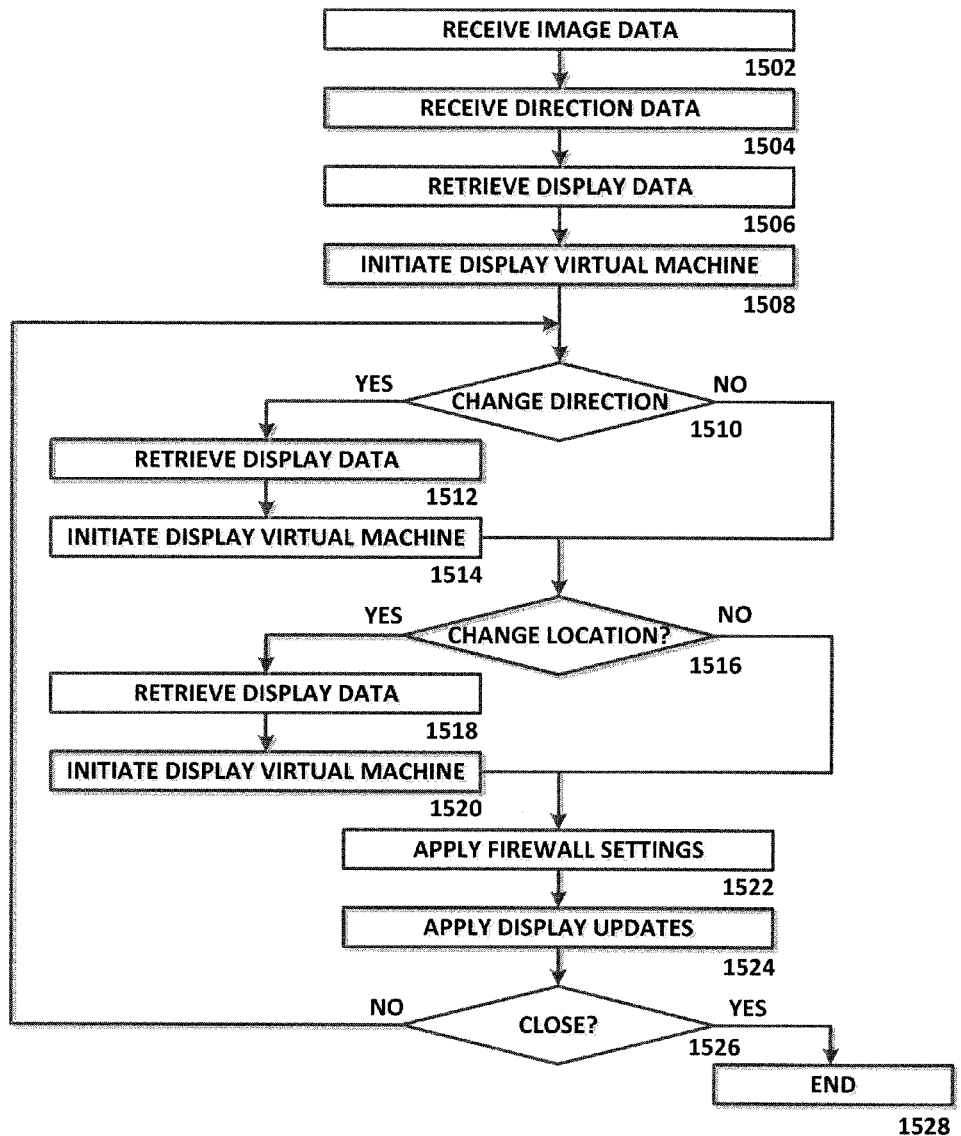
FIG. 15 is a diagram of an algorithm for generating virtual displays in accordance with an exemplary embodiment of the present disclosure.

FIG. 15 is a diagram of an algorithm 1500 for generating virtual displays in accordance with an exemplary embodiment of the present disclosure. Algorithm 1500 can be implemented in hardware or a suitable combination of hardware and software, and can be one or more software systems operating on one or more processors.

Algorithm 1500 begins at 1502, where image data is received. In one exemplary embodiment, the image data can be generated using cameras on an OHMD or in other suitable manners, and can be a series of images or video data that are analyzed to detect items, objects or people having predetermined physical configurations in the image data, such as buildings, furniture or other items, objects or people. The algorithm ten proceeds to 1504, where directional data is generated. In one exemplary embodiment, the directional data can be generated using a digital compass device or other suitable systems. The algorithm then proceeds to 1506.

At 1506, display data for one or more virtual displays is retrieved. In one exemplary embodiment, the directional data and location data associated with an OHMD, a dynamic mobile server or other suitable devices can be used to determine a direction of view of a user or device and to further determine which virtual displays, if any, should be generated on a display device of an OHMD or other suitable devices. For example, if the user is facing north and is 2 feet south of a virtual display, the display data for that virtual display can be retrieved. The algorithm then proceeds to 1508.

At 1508, a virtual machine is initiated for each of the virtual displays. In one exemplary embodiment, the virtual machine can be configured based on user selections, can be associated with an application, can be used to provide data to a user, or other suitable virtual machines can be initiated. In this exemplary embodiment, a user can select a location for a virtual display to provide data of interest to the user, such as a news feed, an audiovisual presentation or other suitable data, and the user can then select the specific type of data to be displayed, such as stock price data, a television show or other suitable data. The data can be associated with a predetermined location, such that the user can select the display data when the user is not in the vicinity of the display, but where the display data is generated for the user when the user moves into the vicinity of the display. Likewise, display data can be configured for other users, such as to create advertising displays, for use in a video game, or for other suitable purposes. Likewise, other suitable processes can be used in addition to or instead of using virtual machines, such as by dedicating one graphics co-processor of a multiple parallel graphics processor array to each virtual display. The algorithm then proceeds to 1510.

At 1510, it is determined whether the user has changed direction, such as by detecting a change in direction data generated by a digital compass system or in other suitable manners. If it is determined that a user has not changed direction, the algorithm proceeds to 1516, otherwise, the algorithm proceeds to 1512 where display data for one or more virtual displays is retrieved, such as based on a determination of displays that would be seen by a user based on the new direction. The algorithm then proceeds to 1514, where virtual machines are initiated for each of the displays. The algorithm then proceeds to 1516.

At 1516, it is determined whether a user has changed locations. In one exemplary embodiment, a user can have a dynamic mobile server 102 that is configured to be carried by the user, and the user can connect to the dynamic mobile server 102 using an OHMD or other suitable interface devices. In this exemplary embodiment, the user can then move while communicating with dynamic mobile server 102 and while viewing virtual displays through the OHMD. Dynamic mobile server 102 can also receive updated location data from a GPS unit or other suitable sources, such that additional virtual displays can be generated as the user walks, drives, or other changes locations. For example, a user can walk through a building with virtual displays set up at different locations, and can use the virtual displays for directions, such as where the user is shopping for items on a shopping list. The location of the items on the shopping list can be mapped out, and as the user approaches one of the items, a virtual display can be generated to direct the user to the item. After the user has obtained the item, a new virtual display can be generated to direct the user to the next closest item.

In another exemplary embodiment, a user can perform a series of tasks, and virtual displays can be generated after each task is completed to instruct the user of the next task. In this exemplary embodiment, a user can be building a structure, and a series of tasks can be presented to the user, such as to place a series of structural supports in predetermined locations (such as wall studs), to install one or more items to the structural supports (such as drywall), to perform a process on the one or more items (such as to paint the drywall), and other suitable work functions. The locations of resources for such work functions (such as storage locations for wall studs, nails, drywall, paint, paint brushes) can also be identified with virtual displays.

In another exemplary embodiment, a user can drive to a meeting, and virtual displays can be generated to direct the user as the user is driving, including directions to an available parking location. After the user parks, directions can be generated for the user to find the correct office building, to take the correct elevator, to select the correct floor in an elevator, and to find the correct office or conference room.

In another exemplary embodiment, a user can participate in a game that includes movement through a building, an obstacle course, a city, or other suitable environments, and virtual displays can be generated as game objectives, such as to find predetermined items associated with virtual displays, to interact with virtual entities or to otherwise engage in an augmented reality environment.

If it is determined at 1516 that the user has not changed locations, the algorithm proceeds to 1522, otherwise the algorithm proceeds to 1518 where display data is retrieved as a function of the new location data. The algorithm then proceeds to 1520, where a virtual machine or other suitable process is initiated for each display. The algorithm then proceeds to 1522.

At 1522, firewall settings are applied to one or more of the virtual displays. In one exemplary embodiment, one or more pixels, groups of pixels, coordinates, ranges of coordinates, displays or other suitable selections can be made to identify a firewall. In this exemplary embodiment, a physical region can be identified as a firewalled location, such that any virtual displays or devices within that region are protected by a firewall from being directly accessed by a device outside of the local wireless network of the dynamic mobile server 102, such as through a broadband wireless network that is connected to one of the devices that is connected to dynamic mobile server 102 through the local wireless network. In this manner, a user can protect a virtual display from being accessed from another device, can determine whether a virtual display is being controlled by an external device, and can perform other suitable functions. The algorithm then proceeds to 1524, where display updates are applied, such as due to a change in firewall settings. The algorithm then proceeds to 1526.

At 1526, it is determined whether a user has deactivated dynamic mobile server 102. If not the algorithm returns to 1510, otherwise the algorithm proceeds to 1528, where the virtual display updates and other suitable data is saved, and the process terminates after other suitable termination procedures have been implemented.

In operation, algorithm 1500 allows a user to interact with virtual displays in an augmented reality environment, such as to receive directions, to perform work tasks, for shopping, for game playing or for other suitable purposes. Although algorithm 1500 is shown as a flow chart, the functions of algorithm 1500 can also or alternatively be implemented as a state diagram, as one or more objects or in other suitable manners.

Figure 16:
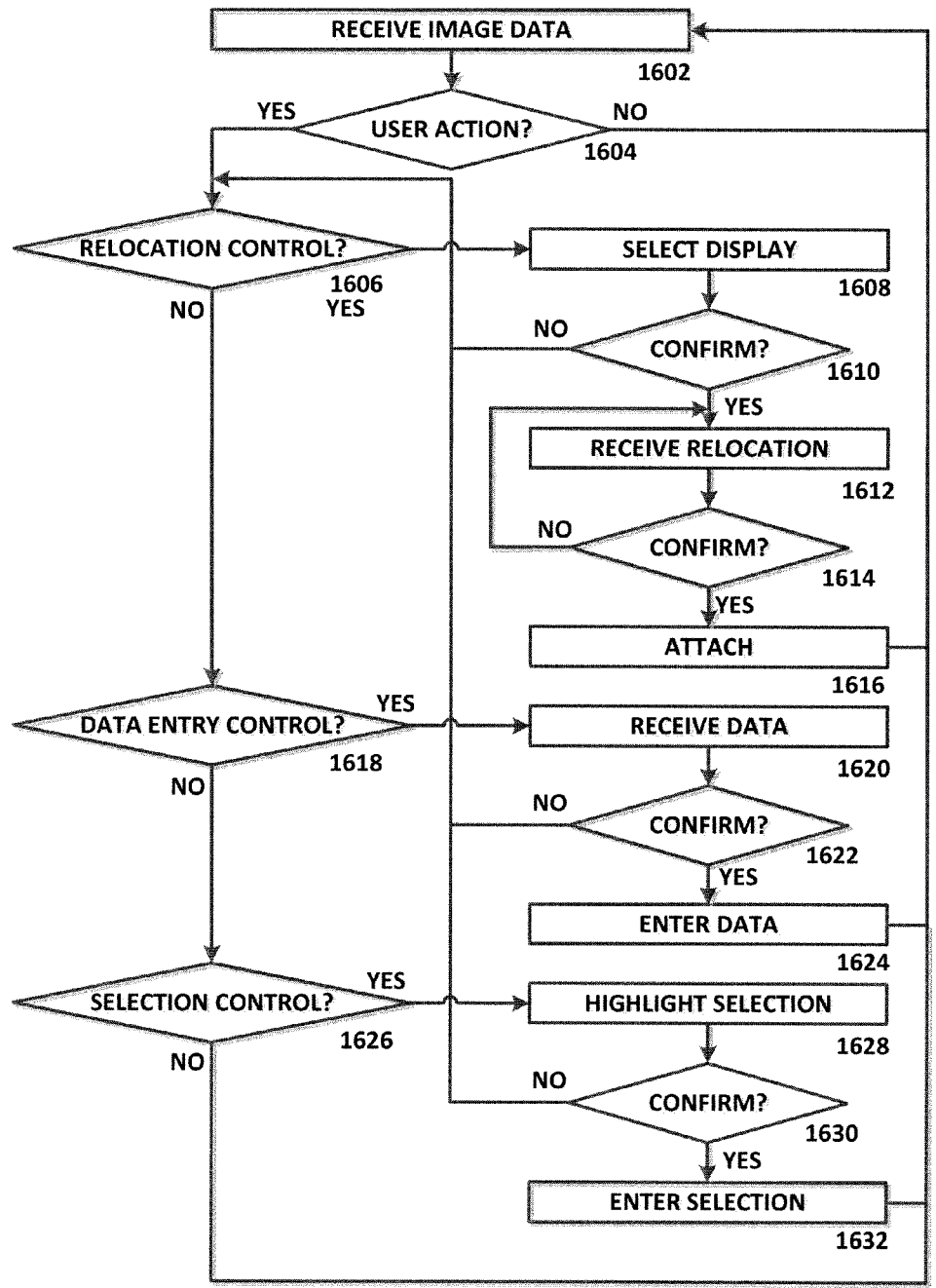
FIG. 16 is a diagram of an algorithm for receiving control data from a virtual display in accordance with an exemplary embodiment of the present disclosure.

FIG. 16 is a diagram of an algorithm 1600 for receiving control data from a virtual display in accordance with an exemplary embodiment of the present disclosure. Algorithm 1600 can be implemented in hardware or a suitable combination of hardware and software, and can be one or more software systems operating on one or more processors.

Algorithm 1600 begins at 1602, where image data is received. In one exemplary embodiment, the image data can be received from a camera of an OHMD or other suitable devices. The algorithm then proceeds to 1604.

At 1604, it is determined whether a user action has been detected. In one exemplary embodiment, the user action can be predetermined action by a user's hand, a user's arm, a user's head, a verbal command or other suitable user actions. If it is determined that no user action has been detected, the algorithm returns to 1602. Otherwise, the algorithm proceeds to 1606.

At 1606, it is determined whether a relocation control has been detected. In one exemplary embodiment, a relocation control can be associated with one or more virtual displays that the user is able to relocate, and can require the user to play a hand in the same location as the virtual display that is to be relocated, to say a phrase, to make a predetermined hand gesture or to perform other suitable actions. If it is determined that a relocation control has not been detected, the algorithm proceeds to 1618, otherwise the algorithm proceeds to 1608.

At 1608, the virtual display associated with the relocation control is selected, such as by increasing the brightness of the virtual display, by changing the color of the virtual display, by outlining the virtual display or in other suitable manners. The algorithm then proceeds to 1610, where the user is prompted to confirm the selection. In one exemplary embodiment, a text prompt can be generated on the user interface screen of an OHMD, a audio prompt can be generated, the user can be given a predetermined amount of time to act, a confirmation action can be detected (such as rotation of the hand or nodding of the head), or other suitable confirmation actions can be detected. If the user does not confirm the selection, the algorithm returns to 1606, otherwise, the algorithm proceeds to 1612.

At 1612, the user relocates the virtual display, such as by dragging the virtual display to a new location or in other suitable manners. In one exemplary embodiment, the display can be anchored to the user's hand, a ring, a wrist watch or other suitable objects, and the virtual display can be generated at each location that the user moves their hand or other object to. In another exemplary embodiment, the virtual display can be shut off and regenerated after the user has stopped moving their hand, or other suitable procedures can also or alternatively be used. The algorithm then proceeds to 1614.

At 1614, the user is prompted to confirm the new location of the display, such as by increasing the brightness of the virtual display, by changing the color of the virtual display, by outlining the virtual display or in other suitable manners. If it is determined that the user has not confirmed the relocation, the algorithm returns to 1612, otherwise the algorithm proceeds to 1616 and the virtual display is attached to the new location. The algorithm then returns to 1602.

At 1618, it is determined whether a data entry control has been received. In one exemplary embodiment, a data entry control can be associated with one or more virtual displays that the user is able to enter data to, and can require the user to play a hand in the same location as the virtual display that is to receive the data, to say a phrase, to make a predetermined hand gesture or to perform other suitable actions. If it is determined that a data entry control has not been detected, the algorithm proceeds to 1626, otherwise the algorithm proceeds to 1620.

At 1620, data for entry is received, such as by generating a virtual keyboard, by receiving spoken data, or in other suitable manners. The data can be repeated within the virtual display, as a line of data across the top or bottom of the user display, or in other suitable manners. After data entry has been completed, the algorithm proceeds to 1622.

At 1622, it is determined whether the user has confirmed the data entry. In one exemplary embodiment, a text prompt can be generated on the user interface screen of an OHMD, an audio prompt can be generated, the user can be given a predetermined amount of time to act, a confirmation action can be detected (such as rotation of the hand or nodding of the head), or other suitable confirmation actions can be detected. If the user does not confirm the selection, the algorithm returns to 1606, otherwise the algorithm proceeds to 1624, where the data is entered. The algorithm then returns to 1602.

At 1626, it is determined whether a selection control has been received. In one exemplary embodiment, a selection control can be associated with one or more virtual displays that the user is able to select, such as a button or control knob, and can require the user to play a hand in the same location as the virtual display that is to be selected, to say a phrase, to make a predetermined hand gesture or to perform other suitable actions. If it is determined that a selection control has not been detected, the algorithm returns to 1602, otherwise the algorithm proceeds to 1628.

At 1628, the selection is highlighted, such as by increasing the brightness of the virtual display, by changing the color of the virtual display, by outlining the virtual display or in other suitable manners. The algorithm then proceeds to 1630, where it is determined whether the user has confirmed the data entry. In one exemplary embodiment, a text prompt can be generated on the user interface screen of an OHMD, an audio prompt can be generated, the user can be given a predetermined amount of time to act, a confirmation action can be detected (such as rotation of the hand or nodding of the head), or other suitable confirmation actions can be detected. If the user does not confirm the selection, the algorithm returns to 1606, otherwise, the algorithm proceeds to 1632, where the selection is entered. The algorithm then returns to 1602.

In operation, algorithm 1600 allows a user to interact with virtual displays in an augmented reality environment, such as to relocate a virtual display, to enter data, to select a control or for other suitable purposes. Although algorithm 1600 is shown as a flow chart, the functions of algorithm 1600 can also or alternatively be implemented as a state diagram, as one or more objects or in other suitable manners.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A dynamic wireless server environment comprising:
    a dynamic mobile server configured to generate a local wireless communications network, the dynamic mobile server having a first processor configured to run a first operating system, a second processor configured to run a second operating system, a processor pooling application configured to operate on one or more of the processors, and a plurality of redundant data memory devices, the first operating system different from the second operating system;
    the processor pooling application configured to allocate processor capacity of the first processor for a first application operating on a first wireless device and processor capacity of the second processor for a second application operating on a second wireless device, wherein the first wireless device is configured to run the first operating system and the second wireless device is configured to run the second operating system;
    a firewall system configured to operate on one or more processors of the dynamic mobile server and configured to prevent a device on an external network and connected to the first wireless device from directly accessing the second wireless device over the local wireless communications network;
    the dynamic mobile server is configured to generate a cubical spatial grid as a function of location data or network address data and a calibration layout placed within an area that can be viewed from an optical head mounted display;
    wherein the dynamic mobile server is configured to analyze image data generated by the optical head mounted display to determine a location of the dynamic mobile server, the first wireless device, and the second wireless device within the cubical spatial grid, and to include a third spatial location dimension to each of the dynamic mobile server, the first wireless device and the second wireless device;
    the dynamic mobile server is configured to assign each of the dynamic mobile server, the first wireless device and the second wireless device a three-dimensional spatial location and device identifier that are mapped to an Internet protocol (IP) network address;
    wherein the dynamic mobile server is configured to update the spatial location relative to the mapped IP address upon movement of any one of the dynamic mobile server, first wireless device or second wireless device;
    wherein the dynamic mobile server is configured to assign the third spatial location based on the image data and frequency timing data received by the dynamic mobile server; and
    the dynamic mobile server is configured to assign three-dimensional spatial location data to the first wireless device and second wireless device relative to the dynamic mobile server, and within the three-dimensional spatial grid formed by the dynamic mobile server.

2. The dynamic wireless server environment of claim 1 further comprising a mobile server interface application configured to operate on the first wireless device, the mobile server interface application configured to generate one or more user controls to allow a user to identify one or more data sources from the second wireless device to be backed up to the wireless server.

3. The dynamic wireless server environment of claim 1, wherein the dynamic mobile server is configured to operate the first application and the second application in cooperation with the first wireless device and the second wireless device.

4. The dynamic wireless server environment of claim 1 wherein the dynamic mobile server is configured to assign unique coordinate data to the first wireless device that identifies a physical location of the first wireless device relative to an origin at the wireless server and is configured to use the unique coordinate data of the first wireless device to update the spatial location of the first wireless device.

5. The dynamic wireless server environment of claim 4 wherein the dynamic mobile server is configured to assign unique coordinate data to the second wireless device that identifies a physical location of the second wireless device relative to the origin at the wireless server and is configured to use the unique coordinate data of the second wireless device to update the spatial location of the second wireless device.

6. The dynamic wireless server environment of claim 5 wherein the dynamic mobile server is configured to generate the unique coordinate data for the first wireless device and the unique coordinate data for the second device in a virtual coordinate system.

7. The dynamic wireless server environment of claim 5 wherein the dynamic mobile server is configured to generate the unique coordinate data for the first wireless device and the unique coordinate data for the second device in the cubical spatial grid.

8. The dynamic wireless server environment of claim 5 wherein the dynamic mobile server is configured to calibrate the unique coordinate data for the first wireless device and the unique coordinate data for the second wireless device as a function of wireless signal strength.

9. The dynamic wireless server environment of claim 1 wherein the firewall system is configured to prevent a device on an external network from directly accessing the first wireless device in a first physical location and the second wireless device in a second physical location.

10. The dynamic wireless server environment of claim 1 wherein the firewall system is configured to prevent a device on an external network connected to the first wireless device from directly accessing the second wireless device over the local wireless network when the second wireless device is in a first physical location and to allow the device on the external network connected to the first wireless device to directly access the second wireless device over the local wireless network when the second device is in a second physical location that is different from the first physical location.

11. A method for controlling access in a dynamic wireless server environment, comprising:

generating a local wireless communications network with a dynamic wireless server having a first processor running a first operating system, a second processor running a second operating system, a processor pooling application operating on one or more of the processors, and a plurality of redundant data memory devices, where the first operating system different from the second operating system;

allocating, with the processor pooling application, processor capacity of the first processor for an application operating on a first wireless device and processor capacity of the second processor for an application operating on a second wireless device, wherein the first wireless device runs the first operating system and the second wireless device runs the second operating system;

activating a firewall system on one or more processors of the dynamic wireless server that is configured to prevent a device on an external network and connected to the first wireless device from directly accessing the second wireless device over the local wireless communications network;

generating a cubical spatial grid by the dynamic wireless server as a function of location data or network address data and a calibration layout placed within an area that can be viewed from an optical head mounted display;

configuring the dynamic wireless server to analyze image data generated by the optical head mounted display to determine a location of the dynamic wireless server, the first wireless device, and the second wireless device within the cubical spatial grid, and to include a third spatial location dimension to each of the dynamic wireless server, the first wireless device and the second wireless device, wherein each of the dynamic wireless server, first wireless device and second wireless device are assigned a three-dimensional spatial location and device identifier that are mapped to an Internet protocol (IP) network address;

configuring the dynamic wireless server to update a spatial location relative to the mapped IP address upon movement of any one of the dynamic wireless server, first wireless device or second wireless device;

wherein the dynamic wireless server is configured to assign the third spatial location as a function of the image data and frequency timing data received by the dynamic wireless server; and wherein the dynamic wireless server is configured to assign the three-dimensional spatial location to the first wireless device and second wireless device is relative to the dynamic wireless server, and within the three-dimensional spatial grid formed by the dynamic wireless server.

12. The method of claim 11 further comprising generating one or more user controls to allow a user to identify one or more data sources to be backed up to the wireless server.

13. The method of claim 11 further comprising allocating processor capacity for an application operating on the first wireless device to a processor of the second wireless device.

14. The method of claim 11 further comprising assigning unique coordinate data to the first wireless device that identifies a physical location of the first wireless device.

15. The method of claim 11 further comprising assigning unique coordinate data to the second wireless device that identifies a physical location of the second wireless device.

16. The method of claim 15 wherein the unique coordinate data for the first wireless device and the unique coordinate data for the second device identifies the physical location of the first wireless device and the physical location of the second wireless device relative to a physical location of the wireless server.

17. The method of claim 15 wherein the unique coordinate data for the first wireless device and the unique coordinate data for the second wireless device is stored in three predetermined data fields of a network address field.

18. The method of claim 11 further comprising preventing a device on an external network from directly accessing the first wireless device and the second wireless device over the local wireless network using a firewall.

19. The method of claim 11, wherein the dynamic wireless server is configured to operate the first application and the second application in cooperation with the first wireless device and the second wireless device.

20. The dynamic wireless server environment of claim 11 wherein the dynamic wireless server is configured to assign unique coordinate data to the first wireless device that identifies a physical location of the first wireless device relative to an origin at the wireless server and is configured to use the unique coordinate data of the first wireless device to update the spatial location of the first wireless device.

* * * * *

UNITED STATES PATENT AND TRADEMARK OFFICE
CERTIFICATE OF CORRECTION

| | |
|---|---|
| PATENT NO. | : 9,529,512 B2 |
| APPLICATION NO. | : 14/606963 |
| DATED | : December 27, 2016 |
| INVENTOR(S) | : James Albert Luckett, Jr. et al. |

It is certified that error appears in the above-identified patent and that said Letters Patent is hereby corrected as shown below:

In the Claims

1. In Column 18, Line 8, in Claim 1, delete "assign" and insert -- assign the --, therefor.

2. In Column 18, Line 44, in Claim 6, delete "second device" and insert -- second wireless device --, therefor.

3. In Column 18, Line 49, in Claim 6, delete "second device" and insert -- second wireless device --, therefor.

4. In Column 19, Line 2, in Claim 10, delete "second device" and insert -- second wireless device --, therefor.

5. In Column 19, Line 13, in Claim 11, delete "system different" and insert -- system is different --, therefor.

6. In Column 20, Lines 25-26, in Claim 16, delete "second device identifies the physical location of the first wireless device" and insert -- second wireless device identifies a physical location of the first wireless device --, therefor.

7. In Column 20, Line 41, in Claim 20, delete "The dynamic wireless server environment of claim 11" and insert -- The method of claim 11 --, therefor.

Signed and Sealed this
Thirtieth Day of May, 2017

Michelle K. Lee
*Director of the United States Patent and Trademark Office*